US009734002B2

(12) United States Patent
Bukov et al.

(10) Patent No.: US 9,734,002 B2
(45) Date of Patent: Aug. 15, 2017

(54) CYCLICAL METHOD AND A DEVICE FOR LOCALIZING UNCONTROLLABLE MULTIPLE FAILURES IN ENGINEERING SYSTEMS IN OPERATION

(71) Applicants: Federal State Budgetary Institution <Federal Agency for Legal Protection of Military, Special and Dual Use Intellectual Activity Results>(FSBI <FALPIAR>), Moscow (RU); Joint-Stock Company "Scientific-research institute of aircraft equipment" (JSC "SRIAE"), Zhukovsky (RU)

(72) Inventors: Valentin Nikolaevich Bukov, Moscow (RU); Igor Nikolaevich Averyanov, Zhukovsky (RU); Andrei Mikhailovich Bronnikov, Moscow (RU); Andrei Leontyevich Kushnir, Zhukovsky (RU); Nikolai Ivanovich Selvesyuk, Moscow (RU)

(73) Assignees: Federal State Budgetary Institution<Federal Agency for Legal Protection of Military, Special and Dual Use Intellectual Activity Results>(FSBI<FALPIAR>), Moscow (RU); Jount-Stock Company"Scientific-Research Institute of Aircraft Equipment" (JSC"SRIAE"), Zhukovsky (RU)

( * ) Notice: Subject to any disclaimer, the term of this patent is extended or adjusted under 35 U.S.C. 154(b) by 73 days.

(21) Appl. No.: 14/714,410

(22) Filed: May 18, 2015

(65) Prior Publication Data
US 2015/0248321 A1 Sep. 3, 2015

Related U.S. Application Data

(63) Continuation-in-part of application No. PCT/RU2012/000958, filed on Nov. 20, 2012.

(51) Int. Cl.
*G06F 11/07* (2006.01)
*G05B 23/02* (2006.01)

(52) U.S. Cl.
CPC ...... *G06F 11/0751* (2013.01); *G05B 23/0275* (2013.01); *G06F 11/079* (2013.01)

(58) Field of Classification Search
USPC .......................................................... 714/37
See application file for complete search history.

(56) References Cited

U.S. PATENT DOCUMENTS 5,544,308 A * 8/1996 Giordano ............ G06F 11/2257
706/45
2005/0081082 A1 * 4/2005 Brodie .................... H04L 43/12
714/4.1

(Continued)

FOREIGN PATENT DOCUMENTS

RU 2 265 236 C1 11/2005
RU 2 430 406 C2 9/2011

*Primary Examiner* — Kamini Patel
(74) *Attorney, Agent, or Firm* — Nath, Goldberg & Meyer; Jerald L. Meyer; Stanley N. Protigal

(57) ABSTRACT

A method and device improve efficiency, depth and reliability of diagnosing technical condition of highly complex objects. The technical effect is achieved by signals received from a diagnosed object (DO). These signals are transformed into a technical condition initial estimate vector for the DO elements. Then, technical condition estimates for the DO elements are specified through a cyclical process and by using a reverse logical model and a direct logical model. A technical condition vector estimate is formed after the cyclical process is completed, and its variable components are used for deciding on technical condition of the diagnosed (Continued)

object elements. The device comprises an interface unit which inputs serve for connecting to the DO data outputs, a measuring unit, an initial estimate forming unit, a switching unit, a reverse triplex logical model and a direct triplex logical model, a result interpretation unit and a control unit.

1 Claim, 5 Drawing Sheets

(56) References Cited

U.S. PATENT DOCUMENTS

| | | | |
|---|---|---|---|
| 2006/0041812 A1* | 2/2006 | Rajski | G01R 31/318547 714/742 |
| 2006/0041814 A1* | 2/2006 | Rajski | G01R 31/318547 714/742 |
| 2010/0058259 A1* | 3/2010 | Erlich | G06F 17/504 716/106 |
| 2012/0151244 A1* | 6/2012 | Ling | G01S 19/235 713/400 |

* cited by examiner

CYCLICAL METHOD AND A DEVICE FOR LOCALIZING UNCONTROLLABLE MULTIPLE FAILURES IN ENGINEERING SYSTEMS IN OPERATION

This is a Continuation-In-Part of International Application No. PCT/RU2012/000958 filed Nov. 20, 2012, an application claiming the benefit to Russian Application No. 2012149034, filed on Nov. 19, 2012, the content of each of which is hereby incorporated by reference in its entirety.

FIELD OF THE INVENTION

The invention relates to the field of computer engineering and control equipment and may be used in functional diagnostics systems providing failure localization (searching failure points) in engineering systems on the basis of information concerning external manifestations of such failures.

PRIOR ART

Functional diagnostics is understood as a process of determining a failure and searching for the failure point against the background of engineering system's ordinary signals, i.e. where a system is used according to its purpose and receives operational (rather than testing) impacts [Machine-Building. Encyclopedia. V. III-7. Measurements, Control, Diagnostics (in Russian)/Ed. by V. V. Klyuev.—M.: Machinostroenie. 1996, p. 404], [Fundamentals of Technical Diagnostics. Book 1. Models of Objects, Diagnostic Methods and Algorithms (in Russian)/Ed. by P. P. Parkhomenko.—M.: Energia. 1976, p. 13].

Diagnosis of engineering systems includes at least two tasks:
  checking an object for correct functioning;
  failure detection, i.e., tracing points and possible reasons for failures causing operation failures or incorrect functioning of an object.

This invention provides a method and a device for solving the second task, namely, failure detection.

Uncontrollable failures are understood in the invention as failures in sub-systems, individual units, modules or elements of an engineering system (hereinafter referred to as "diagnosed object"), wherein said failures may not be detected by control systems themselves (including built-in test means). From the point of the modern system theory, such failures may relate both to observable, i.e., having a potential possibility of being detected, and to non-observable, i.e., having no such a potential possibility. In the first case, the method and the device, as proposed herein, indicate a failure point, and in the second case form a solution of insufficiency of information available for finding a solution of the localizing task.

An uncontrollable failure occurring in a system may lead to its operation failure or to its incorrect functioning in all or individual modes, but may not lead to any manifestations (e.g., in a case of redundancy of a failed element). Thus, the task of localizing for uncontrollable failures is understood as tracing points and possible reasons for failures according to their observable occurrences.

At present, most methods for localizing failures in engineering objects are based on the use of logical or Boolean models as diagnosis models [Machine-Building. Encyclopedia. V. III-7. Measurements, Control, Diagnostics (in Russian)/Ed. by V. V. Klyuev.—M.: Machinostroenie. 1996], [Fundamentals of Technical Diagnostics. Book 1. Models of Objects, Diagnostic Methods and Algorithms (in Russian)/Ed. by P. P. Parkhomenko.—M.: Energia. 1976], [L. P. Kolodezhny, A. V. Chernodarov. Reliability and Engineering Diagnostics: Textbook for students of air-force higher education institutions.—M.: Publishing House at the Air-Force Academy Named after Prof. N. E. Zhukovsky and Yu.A. Gagarin, 2010].

The process of formal description of failures possible in an engineering system and of their consequences is supported by experiences accumulated in each particular field of technology, e.g., aviation, and is regulated by corresponding documents [Manual P4754 on certification processes for highly integrated complex on-board systems of civil aviation aircraft (on the basis of documents SAE/ARP4754 and EUROCAE/ED-79), 2007; Manual P4761 on safety assessment of systems and on-board equipment of civil aviation aircraft, 2010].

Logical methods for describing propagation models and failure detection processes include those of the theory of graphs [O. Ore, Graphs and Their Uses (Translated into Russian).—M.: Mir Publishers, 1965; C. Berge, Theorie Des Graphes et Ses Applications (Translated into Russian).—M.: IL Publishers, 1962].

The closest to the claimed device and a method of its functioning is a functional diagnostic device (DD), [Fundamentals of Technical Diagnostics. Book 1. Models of Objects, Diagnostic Methods and Algorithms (in Russian)/Ed. by P. P. Parkhomenko.—M.: Energia. 1976, p. 38].

A diagnosed object (hereinafter "DO") is an interrelated set of parts (systems, sub-systems, units, apparatuses, modules, elements) hereinafter referred to in general as "elements". For carrying out diagnosis, a failure localization task is set, i.e. indication of a failed element. An DO functions under influence of input signals coming thereto and forms output signals that may be or may be not available for direct measurements. A diagnosed object is linked to the diagnostic device (DD) via an interface unit (IU).

The technical condition of the DO is expressed by DO technical condition vector X comprising n components in the form of variables $x_j$ corresponding to the technical condition of the DO elements; here, j is a sequence number of an elements from the plurality of the DO n elements. The number n is X-vector length. The principal peculiarity of DO directly uncontrollable failures is unavailability of its technical condition vector X for direct measurement. Therefore, a DD uses a specially formed estimation $\hat{X}$ of this vector for diagnosing this vector. The task of failure troubleshooting is execution of the following equality $$X = \hat{X}. \qquad (1)$$

The interface unit (IU) under the action of the control unit (CU) generates links of the measuring unit (MU) with the DO directly monitored parameters containing both explicit information Q on the DO operation mode and implicit information Z on the technical condition of its elements. Information on the DO operation mode is transferred to the DD for performing corresponding settings of its units. The DO input and output signals may be or may be not directly included into the parameters of Q and Z. And it is not necessary that all the DO elements are available for direct control by the MU. The measuring unit MU is a device of functional control and, on the basis of methods provided therein (e.g., methods for monitoring tolerances) determines operability or non-operability of some (principally not all) DO elements of their combinations. The vector Y of failure manifestations is formed at the MU output. In addition, the IU generates estimation $\hat{X}$ of the technical condition vector X. The DD comprises a formalized model (FM) of the diagnosed object (DO) forming estimation $\hat{Y}$ of the failure manifestations vector with respect to estimation $\hat{X}$ of the technical condition vector. When estimation $\hat{X}$ is set correctly, i.e., on the condition (1), which is the failure localization task, vectors of measured and calculated failure manifestations for the DO should coincide:

$$Y=\hat{Y}. \qquad (2)$$

This is controlled by the result interpretation unit (RIU) that, while the above identity is performed, forms diagnosis results. Otherwise, the RIU transmits to the CU an instruction to correct estimation $\hat{X}$ by acting on the IU. If failures are found, the RIU also issues instructions to reconfigure the DO. This represents communication between the RIU and the DO.

In order to trace a failure point, existing DDs of state of art use a direct logical model (DLM) that describes dependence of failure manifestations (failure influence propagation and observed deviations from the normal functioning) on a point and nature of failures in a system. In this case the diagnostic device comprises: a control unit CU, a measuring unit MU, a direct logical model DLM, a result interpretation unit RIU.

In addition, a reverse logical model (RLM) is used that describes dependence of possible failures (type of failures and placing of failures) on failure manifestations. Using RLM significantly decreases the scale of computations. If a RLM is used, the DD comprises: a control unit CU, an interface unit IU, a measuring unit MU, a result interpretation unit RIU and a RLM. Usually, a DLM and a RLM are used in different functional schemes separately.

In order to describe operation of logical models and other units formally, logical operators AND, OR, NOT are used.

The known methods and devices have significant constraints:

1) Use of the DD based on a DLM for localizing of failures leads to a high computational costs, while use of a diagnostic device based on a RLM does not enable to formulate a correct solution due to ambiguity of obtained results.

2) Frequently, for simplifying a DD implementation, assumption concerning low possibility of simultaneous failure of two or more elements is introduced. In this case a number of searches in a DD based on a DLM is reduced to n (where n is a length of vector X, i.e., a number of DO elements which technical condition is to be determined). The same assumption may be used in a case where a DD is built on the basis of a reverse logical model. However, in this case a DD may determine failed elements incorrectly, if two or more failures occur simultaneously.

At the same time, experiences show that multiple failures in engineering systems are not rare, and, due to impossibility to efficiently repair some or other failure in practice, it is frequently the cause that an engineering system accumulates both similar and dissimilar failures.

3) A common drawback of the existing methods of diagnosis relates to the limited nature of the Boolean algebra used therein that makes, in each computational tact, to refer considered elements of an diagnosed object (DO) either to operable or to non-operable.

SUMMARY OF THE INVENTION

This invention is based on the task of improving performance.

The technical effect of the invention is higher diagnosis efficiency, depth and reliability during diagnosing technical condition of highly complex objects.

In order to solve the stated task and achieve the indicated technical effect, the cyclical method for troubleshooting uncontrollable multiple failures in engineering systems in the process of their functioning is provided, consisting in that signals are received from a diagnosed object, a failure manifestation vector with Boolean elements is defined on the basis of these signals, a vector of technical condition initial estimates with triplex values of "operable", "non-operable", "condition not determined" for the elements of the diagnosed object is formed from the failure manifestation vector on the basis of the exit matrix canonization. Then, with the aid of a triplex logical model of reverse dependency using a triplex logical matrix of reverse dependency, the technical condition estimate vector for the diagnosed object elements is cyclically specified until either its estimates are not changed, or a pre-set number of tacts is performed. After this, "condition not determined" values of the elements of the technical condition estimate vector are specified by alternately setting all combinations of these elements with "operable" and "non-operable" values and using cyclical specification of the elements estimates on the basis of line-by-line application of a triplex logical model of direct dependency using a logical matrix of direct dependency for failure propagation, duration of each cycle being determined by a number of steps, and this number being equal to the length of the technical condition vector for the diagnosed object elements; then, a final value of the technical condition estimate vector is issued for the diagnosed object.

The elements of the technical condition estimate vector have triplex values of:
- 0—the respective element of the diagnosed object is definitely operable,
- 1—the respective element of the diagnosed object is definitely non-operable,
- *—no unambiguous conclusion on operability of the respective element of the diagnosed object may be made.

In order to solve the stated task and achieve the indicated technical effect, the device for localizing uncontrollable multiple failures in engineering systems is provided, comprising an interface unit which two inputs serve for connection to two data outputs of a diagnosed object, respectively, a measuring unit, an initial estimate forming unit, a switching unit, a decision-taking unit based on a triplex logical model of direct dependency using a logical matrix of direct dependency, a decision-taking unit based on a triplex logical model of reverse dependency using a logical matrix of reverse dependency, a result interpretation unit and a control unit, wherein the interface unit output is connected to the measuring unit input, and the measuring unit output is connected to the input of the initial estimate forming unit; the first output of the initial estimate forming unit is connected to the first input of the switching unit, and its second output is connected to the second input of the switching unit; the first output of the switching unit is connected to the input of the decision-taking unit based on a triplex logical model of reverse dependency using a logical matrix of reverse dependency, and its second output is connected to the input of the decision-taking unit based on a triplex logical model of direct dependency using a logical matrix of direct dependency; the output of the decision-taking unit based on a triplex logical model of reverse dependency is connected to the third input of the switching unit, and the output of the decision-taking unit based on a triplex logical model of direct dependency is connected to the fourth input of the switching unit, the third output of the switching unit is connected to the input of the result interpretation unit which first output is connected to the input of the control unit, and the second output serves for displaying data on diagnosis results; the output of the control unit is connected to the controlling input of the interface unit.

A further embodiment of the device is possible, wherein it is advisable that the result interpretation unit is provided with the third output serving for connection to the controlling input of a diagnosed object.

The main essential difference of the invention from analogous solutions is alternate use of the reverse and direct logical models described with the aid of failure propagation logical matrices of direct and reverse dependency. The use of a reverse logical model enables to significantly reduce computational burden or expenses for hardware, and the use of a direct logical model enables to overcome ambiguity of results obtained.

New diagnosis possibilities used in the invention become available due to the adoption of triplex variables enabling to divide the elements of a diagnosed object into three categories: operable, non-operable and those in which respect it is still impossible to formulate an unambiguous statement. The use of a triplex description for the technical condition of a diagnosed object is the other essential difference of the proposed invention from analogous solutions.

A known method for localizing uncontrollable failures in engineering objects is taken as the basis, which consists in that a condition of the diagnosed object elements, as available for direct control, is first determined by processing signals from these elements. Then, on the basis of information on the condition of directly controlled parts and on internal links of the diagnosed object, a condition of the other diagnosed object elements, i.e., those that are not directly controlled, is determined. The present invention uses triplex variables having the values of "operable", "non-operable", "condition not determined", instead of Boolean algebra variables, for formally describing a technical condition of the diagnosed object elements. Initial technical condition estimates are formed for the diagnosed object elements on the basis of information of operability of the directly controlled elements. Then, in order to specify these technical condition estimates for the diagnosed object elements, as have been given the "condition not determined" value, cyclical processes are used wherein the direct and the reverse triplex logical models of the diagnosed object are alternated. During these processes diagnosis results are formed and issued in the terms of the said triplex variables. Moreover, either completion of a set number of cycles, or the absence of changes in cyclically specified estimates is used as the rule of termination of the cyclical processes for specifying estimates of technical condition of the diagnosed object elements.

The above advantages of the invention as well as its peculiar features are explained in the following description of the best mode for carrying out of the invention with reference to the accompanying drawings.

BEST MODE FOR CARRYING OUT THE INVENTION

Figure 1:
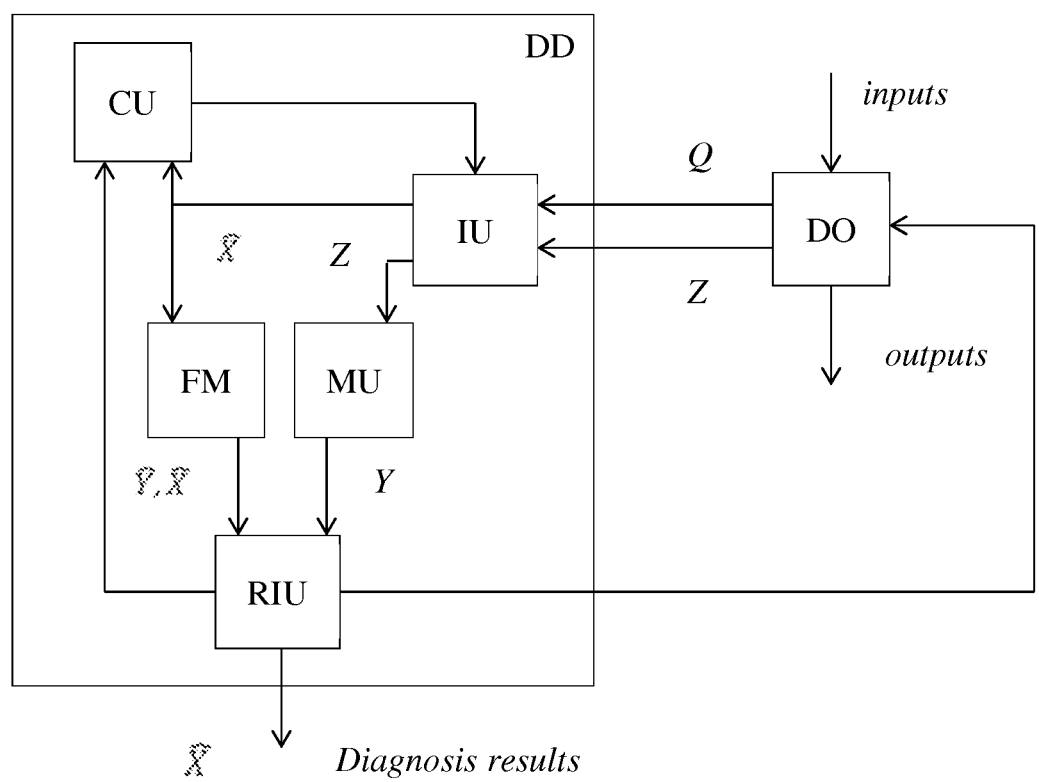
FIG. 1 shows a functional diagram of the diagnostic device (DD) according to the closest analogous solution.
Figure 2:
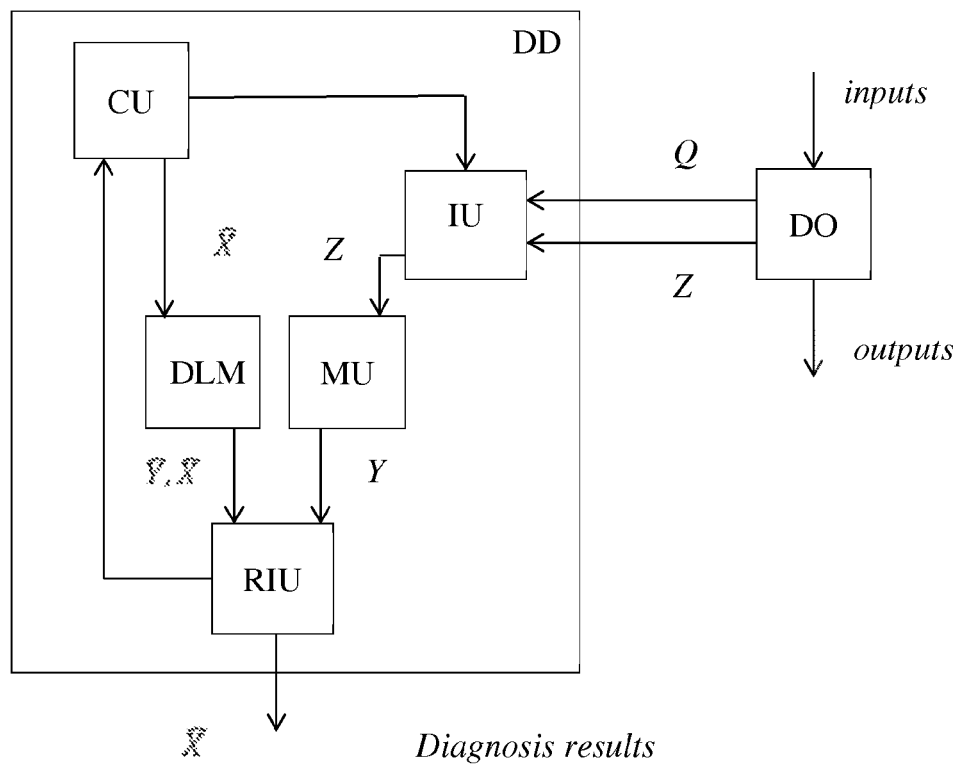
FIG. 2—same as FIG. 1, a DD based on a direct logical model.
Figure 3:
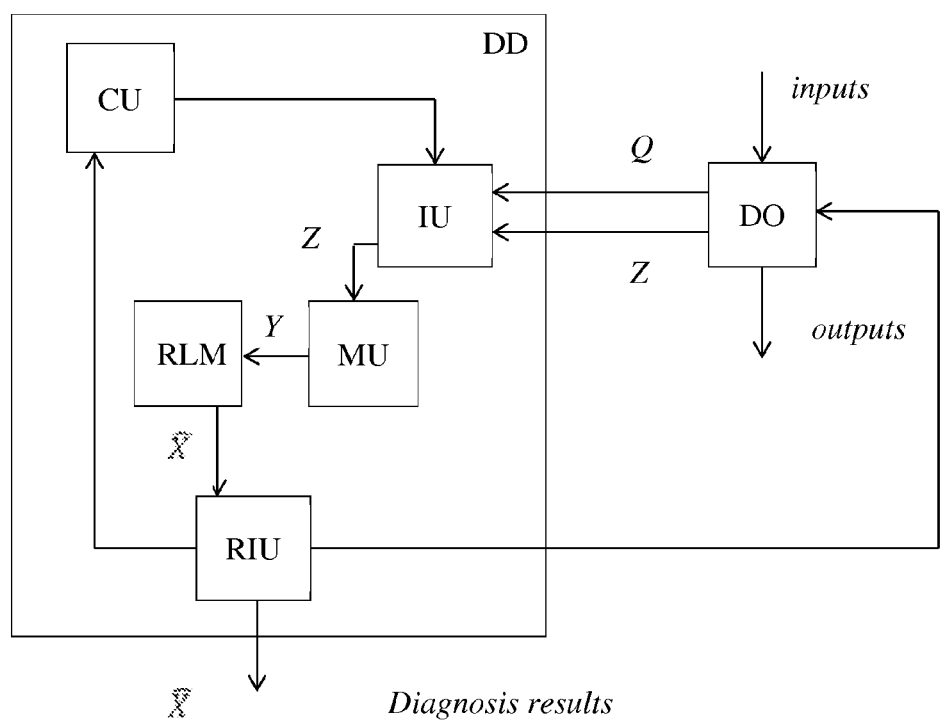
FIG. 3—same as FIG. 1, a DD based on a reverse logical model.

Since the method can be implemented with the use of the operating device (FIG. 4), its full description will be given in the section explaining the operation of the device.

The device (FIG. 4) for localizing uncontrollable multiple failures in engineering systems (DTF) comprises the interface unit 1 (IU), which two inputs serve for connecting to the data outputs of the diagnosed object 2 (DO). The device further comprises the measuring unit 3 (MU), the initial estimate forming unit 4 (IEFU), the switching unit 5 (SU), the decision-taking unit based on a triplex logical model of reverse dependency 6 (DUMRD) and the decision-taking unit based on a triplex logical model of direct dependency 7 (DUMDD), the result interpretation unit 8 (RIU), and the control unit 9 (CU). The output of the interface unit is connected to the input of the MU 3, and the output of the MU 3 is connected to the input of the initial estimate forming unit 4. The first output of the IEFU 4 is connected to the first input of the SU 5, and its second output is connected to the second input of the SU 5. The first output of the SU 5 is connected to the input of the DUMRD 6, and its second output is connected to the input of the DUMDD 7. The output of the DUMRD 6 is connected to the third input of the switching unit 5, and the output of the DUMDD 4 is connected to the fourth input of the SU 5. The third output of the SU 5 is connected to the input of the RIU 8, which first output is connected to the input of the CU 9, and the second output serves for displaying diagnosis result data. The output of the CU 9 is connected to the controlling input of the interface unit 1.

Furthermore, the RIU 8 may be provided with a third output that serves for connecting to the controlling input of the DO 2.

The device (FIG. 4) can be operated as follows.

Signals Q comprising explicit information of the functioning mode of the DO 2, and signals Z comprising implicit information on the technical condition of the elements of the DO 2 are supplied to the inputs of the DTF IU 1, being transmitted by the DO 2. The diagnosis process has cyclical nature. Each cycle starts, when the IU 1, in accordance with instructions coming from the CU 9 and signals Q, selectively transmits signals Z to the MU 3 that, in its turn, transforms them into signals corresponding to the failure manifestation vector Y in the current cycle and transmits them to the IEFU 4. This unit 4 forms signals corresponding to an initial estimate value for the DO technical condition vector $\hat{X}$. These signals from the IEFU 4 are transmitted to the switching unit 5 that analyzes operation results DUMRD 6 and DUMDD 7 (for this, feedback is provided for between the outputs of the DUMRD 6 and DUMDD 7 and the third and the fourth inputs of the SU 5). Depending on an analysis result, the SU 5 connects to one of these models and feeds signals corresponding to a current estimate value $\hat{X}$ for the technical condition of the DO 2 (here, k is a number of a diagnosis cycle current tact), or supplies the RIU 8 with signals corresponding to a final estimate X̂(h) for the technical condition of the DO 2 (here, h if a number of a diagnosis cycle last tact). The RIU 8 supplies, from its first output, signals to the CU 9 for controlling diagnosis process steps, and issues, from its second output, a diagnosis result in the form of signals corresponding to the obtained estimate X̂ of the technical condition of the DO 2. Signals for reconfiguring the DO 2 may be supplied from the third output of the RIU 8 to the DO 2, if it is provided by the task to be fulfilled.

Theoretical Fundamentals of the Proposed Invention

This invention is based on the theory of mixed directed graphs with two logical operators OR and AND, only uppercase letters are used for denoting the operators herein.

A graph of the diagnosed object technical condition is formed by known techniques [O. Ore, Graphs and Their Uses (Translated into Russian).—M.: Mir Publishers, 1965; C. Berge, Theorie Des Graphes et Ses Applications (Translated into Russian).—M.: IL Publishers, 1962] from failure analysis tables for a particular engineering system that are obtained, in their turn, according to methodologies adopted in this industry [Manual P4754 on certification processes for highly integrated complex on-board systems of civil aviation aircraft (on the basis of documents SAE/ARP4754 and EUROCAE/ED-79), 2007; Manual P4761 on safety assessment of systems and on-board equipment of civil aviation aircraft, 2010].

This invention uses only directed (transitions between vertices are possible in one direction, as indicated by arrow, only) mixed (two different operators are used) graphs.

Each part of a diagnosed object, which is considered from the point of failure analysis as independent, is a sub-system, assembly or element. Such a part is represented in a graph by the corresponding vertex (node), and all interactions between these parts are represented by directed links (ribs, arrows) between vortices. Proceeding from methodical considerations, a graph of general kind (with a random number of interlinks) is usually transformed to the kind with not more than two inputs and two outputs by decomposing it (partitioning into bound parts). Each graph vertex has its own fixed tuple of input and output logic represented by the operators "OR" and "AND". The "OR" operator at the node input means that the corresponding part of the system, as identifiable with this node, is activated (starts functioning, receives information, etc.), if a signal (of information, power, etc.) is present even at one of the inputs (incoming arrow); and, respectively, "AND"—if a signal (of information, power, etc.) is present at both inputs simultaneously. The "OR" operator at the vertex output means that, according to a definite rule, the corresponding part of the system issues a signal (control instruction, information, power, etc.) to one of the vertices bound thereto along the outgoing arrow; and, respectively, "AND"—is such a signal is issued to both vertices simultaneously. Some vertices of such a graph may be elements with possible failures, some are internal processes, and some are manifestations of such failures. Each vertex of a graph is considered as something whole and indivisible. Some vertices may be incomplete in terms of number of inputs and outputs. Only sequence numbers of vertices fix the points of the system input and output.

Figure 5:
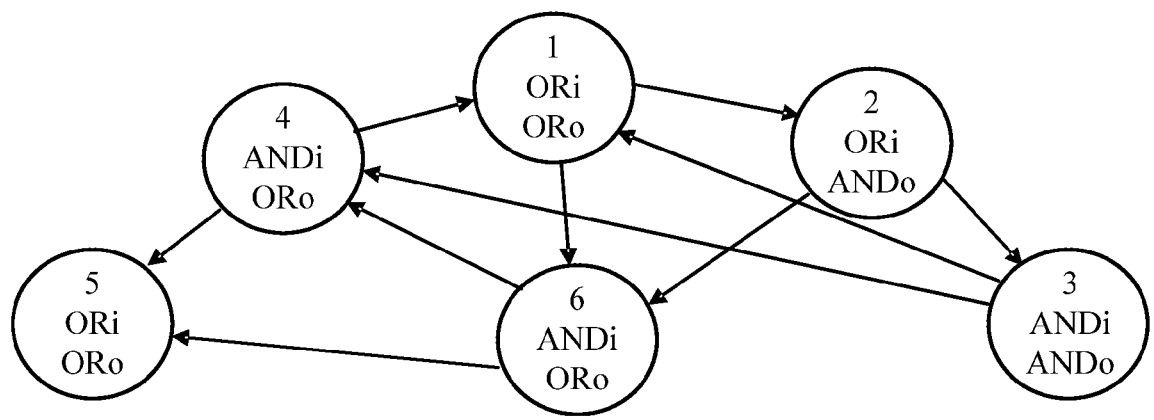
FIG. 5 shows a mixed directed graph as a methodical example.

A directed mixed graph for a hypothetical DO 2 with six vertices is shown in FIG. 5 as a methodical example. In each particular case such a graph for a diagnosed object 2 is formed by experts, proceeding from analysis results of its structure and information flows (power, instructions, reflexes, etc.) or its arranged mathematical models. The symbols shown in FIG. 5 have the following meanings:

ORi—operator "OR" at the element input;

ANDi—operator "AND" at the element input;

ORo—operator "OR" at the element output; this operator is accompanied by the indication on the rule for selecting an element output at which an outgoing signal is formed (according to time-schedule, depending on an DO mode of operation, in a function from some external or internal parameters, etc.);

ANDo—operator "AND" at the element output.

Thus, the element 1 in FIG. 5 has two inputs (two incoming arrows) from the elements 3 and 4 with the ORi operator. It means that this element of the diagnosed object 2 is activated (starts working, performs the prescribed function), if a signal (of information, power, etc.) is present at even one of the two said inputs. This element also has two outputs (two outgoing arrows) toward the elements 2 and 6 with the ORo operator. It means that in the result of action of the element 1 on one of the elements 2 or 6, depending on some known rule, a signal (information, power, etc.) is transmitted. By analogy, the element 6 is activated by simultaneously present signals from the elements 1 and 2 (ANDi operator), and in the result of its functioning it transmits signals to the element 4 or 5 (ORo operator). The elements 2, 3, and 5 in FIG. 5 are incomplete.

This example shows the vertices 1 and 3—system elements that may contain failures, and the vertices 1 and 5—system elements wherein these failures manifest (may be detected and fixed), correspondingly, the vertices 2, 4 and 6 are some inner elements that do not relate to either of these types, but ensure the provision of the studied processes logics.

It should be noted that the claimed technical solution attaches importance to two oppositely directed processes: it is, first, determination of consequences or manifestations that may be caused by failures in the system, and, second, failure localizing, i.e., search for the reason of the system incorrect functioning. These processes are supported by direct and reverse logic, respectively.

A process of failure influence propagation in a diagnosed object DO 2 with triplex description runs in accordance with the rules of logic analysis of such a process that are illustrated in Table 1. This process corresponds to failure (incorrect functioning) influence propagating from the place of origin to other parts and systems until manifestating of that failure.

TABLE 1

| Symbols and line numbers | | Arithmetic of direct logic — Column numbers and formulae | | | | | | | |
|---|---|---|---|---|---|---|---|---|---|
| | | 1 | 2 | 3 | 4 | 5 | 6 | 7 | 8 | 9 |
| ORi | 1 | $1+1=1$ | $1+0=1$ | $1+*=1$ | $0+1=0$ | $0+0=0$ | $0+*=*$ | $*+1=1$ | $*+0=*$ | $*+*=*$ |
| ANDi | 2 | $1\times1=1$ | $1\times0=0$ | $1\times*=*$ | $0\times1=0$ | $0\times0=0$ | $0\times*=0$ | $*\times1=*$ | $*\times0=0$ | $*\times*=*$ |

TABLE 1-continued

Arithmetic of direct logic

| Symbols and line numbers | | Column numbers and formulae | | | | | | | |
|---|---|---|---|---|---|---|---|---|---|
| | | 1 | 2 | 3 | 4 | 5 | 6 | 7 | 8 | 9 |
| ORo | 3 | ~~1=1+1~~ | 1=1+0 | ~~1=1+*~~ | 1=0+1 | 0=0+0 | *=0+* | ~~1=*+1~~ | *=*+0 | *=*+* |
| ANDo | 4 | 1=1×1 | ~~0=1×0~~ | ~~*=1×*~~ | 0=0×1 | 0=0×0 | 0=0×* | *=*×1 | ~~*=*×0~~ | *=*×* |

Here and after, "0" means absence of a failure, "1" means presence of a failure, its manifestation or influence, "*" means uncertain condition; lowercase letters "i" and "o" are used for denoting operators relating to inputs and outputs of the DO 2 elements, respectively.

It is to be noted that in two last lines of the Table 1 some combinations are absent (stricken-through), i.e., corresponding formulae do not exist as such, and the provided combinations contradict to the definitions of the corresponding operators "OR" or "AND". Such combinations are of no interest when analyzing failure influence propagation (direct logic), but are used for forming reverse analysis logic.

Reverse analysis logic corresponds to what might have been at the element input when its output is known. This corresponds to the direction of the failure localizing (tracing) process, starting from its manifestation. The results of reversing the formulae shown in Table 1 are presented in Table 2, where the operators obtained after reversion are additionally marked with the lowercase letter "r".

selves, and a failure in others may be just a consequence of the failure in the former ones.

In order to simplify solution formalizations, table notation is used. The general rules of transition from directed mixed graphs to the table notation are as follows.

The following notations are introduced: $x_j(k)$ is a triplex value of the j-component of the condition (vertex) of the graph in the beginning of the regular k-tact ($x_j=0$ means the absence of a failure in the j-element, $x_j=1$ is the presence, influence or manifestation of a failure in the j-element, $x_j=*$ is an indefinite condition of the j-element), $x_j(k+1)$ is a triplex value of the condition of the j-component (vertex) of the graph after the regular k-tact, the upper index is the symbol of a logical operator at the input of the graph vertex (e.g., $x^{ORi}$ indicates the OR operator at the element input); the lower index is the symbol of a logical operator at its output (e.g., $x_{ORo}$ indicates the operator OR at the element output). The sequence number j of each component corresponds to the sequence number of the graph vertex and

TABLE 2

Arithmetic of reverse logic

| Symbols and line numbers | | Column numbers and formulae | | | | | | | | |
|---|---|---|---|---|---|---|---|---|---|---|
| | | 1 | 2 | 3 | 4 | 5 | 6 | 7 | 8 | 9 |
| rORi | 1 | 1=1+1 | 1=1+0 | 1=1+* | 1=0+1 | 0=0+0 | **\*=0+*** | **1=\*+1** | **\*=\*+0** | **\*=\*+*** |
| rANDi | 2 | 1=1×1 | 0=1×0 | **\*=1×*** | 0=0×1 | 0=0×0 | 0=0×* | **\*=\*×1** | **0=\*×0** | **\*=\*×*** |
| rORo | 3 | Conflict | 1+0=1 | Conflict | 0+1=1 | 0+0=0 | 0+*=* | Conflict | *+0=* | *+*=* |
| rANDo | 4 | 1×1=1 | Conflict | Conflict | 0×1=0 | 0×0=0 | 0×*=0 | *×1=* | Conflict | *×*=* |

Cells causing multiplication of variants are highlighted by bold frames in Table 2. Every time when this situation occurs, branching of a "failure tree" that is not explicitly calculated herein takes place. Thus, during analyzing in the reverse direction it may be stated that the presence of 1 at the output of the logical operator OR may be correlated to the presence of is at its both inputs or 1 at either of them.

The absence of some formulae in the Table 1 leads to conflict (or contradictory) situations appearing in corresponding cells of Table 2. These cells contain the word "conflict". If a conflict appears, the chain of events under study (transition from a condition to another condition in reverse analysis tacts) is incorrect in terms of logical models of direct and reverse dependency. Therefore, such a chain of events is excluded from further analysis.

Failure Modeling

The present invention pre-supposes that for any real diagnosed object 2 a directed mixed graph of developing and manifesting failures in this DO 2 may be formed on the basis of its analysis. A failure may be a transitory (malfunction) or permanent (prolonged). Some DO elements may fail themselves, and a failure in others may be just a consequence of encrypts the physical content and relation to a category: a failure, its manifestation or an inner variable.

Then, the condition transition formula is formed:

$$X(k+1) = DM \diamond X(k) + X_{HO}(k), \quad (3)$$

wherein the left side contains the DO condition vector written in the form of a vector with n components (according to the graph number of vertices) after k-tact of the direct analysis. The right side contains a sum (according to Table 1) of the two summands, first of them being a further composition (marked by the sign $\diamond$) of the DM matrix called a failure propagation logical matrix of direct dependency (Dependency Matrix) and the DO condition $X(k)$ vector in the beginning of the k-tact, and the second of them being the $X_{HO}(k)$ vector, taking into account the presence of so-called direct failures in the DO. If such failures are present, the 1-values are assigned to the corresponding components of the $X_{HO}(k)$ vector. Failures may be both permanent, and transient (malfunction). Let's assume that a transient malfunction of the q-element appears during functioning of the system ($1 \leq q \leq n$). In order to model influence of such a malfunction, the 1-value is assigned to the q-component of the $X_{HO}(k)$ vector. Then, the cyclical use of the formula (3) enables to trace propagation of the element malfunction influence on the DO. When the malfunction is over, the 0-value is assigned to the q-component of the $X_{HO}(k)$ vector. Now, the cyclical use of the formula (3) enables to trace the process of restoring the DO after the element malfunction is terminated. During performing the failure localizing process being the essence of this invention the vector $X_{HO}(k)$ is considered as unknown and is not used in the analysis.

The cells of the DM matrix having the n×n size are filled with 0s and 1s in accordance with the DO directed mixed graph, while observing the following rules: the input logic operator of the system corresponding element (graph vertex) is assigned (written to the left) to each line of the matrix, the output logic operator of the system corresponding element is assigned (written below) to each column of the matrix. At the crossing of each l-line and q-column 1 is put, if there is a directed link from the q-element to the l-element (from the q-vertex to the l-vertex of the graph) in the DO. The other cells are filled by 0s.

A model of the kind (3) is a direct triplex logical model (DTLM). Compact entry (3) resembles the matrix notation, but is not it in the sense that the composition marked with the sign ◊ is not a matrix algebra operation. The principal feature of the DM, as well as the mixed graph (in this case, that is shown in FIG. 5), is that particular logical operators are allocated to the lines and columns of particular logical operators.

The model (3) for the directed mixed graph is given as an example in FIG. 5. In accordance with the above-described rule, the following formula is equivalent to the graph shown in FIG. 5:

$$\begin{bmatrix} x_1(k+1) \\ x_2(k+1) \\ x_3(k+1) \\ x_4(k+1) \\ x_5(k+1) \\ x_6(k+1) \end{bmatrix} = \begin{matrix} ORi \\ ORi \\ ANDi \\ ANDi \\ ORi \\ ANDi \end{matrix} \underbrace{\begin{bmatrix} 0 & 0 & 1 & 1 & 0 & 0 \\ 1 & 0 & 0 & 0 & 0 & 0 \\ 0 & 1 & 0 & 0 & 0 & 0 \\ 0 & 0 & 1 & 0 & 0 & 1 \\ 0 & 0 & 0 & 1 & 0 & 1 \\ 1 & 1 & 0 & 0 & 0 & 0 \end{bmatrix}}_{DM} \diamond \quad (4)$$

$$\begin{matrix} & ORo & ANDo & ANDo & ORo & ORo & ORo \end{matrix}$$

$$\begin{bmatrix} x_1(k) \\ x_2(k) \\ x_3(k) \\ x_4(k) \\ x_5(k) \\ x_6(k) \end{bmatrix} + \begin{bmatrix} x_{HO1}(k) \\ x_{HO2}(k) \\ x_{HO3}(k) \\ x_{HO4}(k) \\ x_{HO5}(k) \\ x_{HO6}(k) \end{bmatrix}.$$

The general rules of fulfilling a composition in the model of the kind (3), that comprises the DM, are as follows.

A value of each j-component $x_j(k+1)$ of the diagnosed object condition model in the k+1 tact with a possible value from the triad "0, 1, *" is determined by a composition of coefficients of the j-line of the DM and $x_j(k)$ components of the vector in the k tact in the right part of the equality according to the following rules:

1. The $x_j(k)$ components to which 0s correspond according to the order of sequence in a DM line, are not used in the composition.

Thus, it relates to the $x_1(k)$, $x_2(k)$, $x_5(k)$, $x_6(k)$ components in the first line of the formula (4) of the illustrative example.

2. The components, which locations correspond to 1s in a DM line, are used in the composition as follows:
   if 1 in the DM matrix, which corresponds to the $x_1(k)$ component, is in a column marked with the ANDo operator below, then this $x_1(k)$ component participates in the composition with its value directly;
   if 1 in the DM matrix, which corresponds to the $x_p(k)$ component, is in a column marked with the ORo operator below, then the above rule of selecting a corresponding DO element is taken into consideration, depending on which the $x_p(k)$ component either participates with its value (in a case where the corresponding output of a DO element is used), or the value of 0 is conditionally assigned to the $x_p(k)$ component (in a case where the corresponding output is not used);
   an operator corresponding to a given DM line (is put to the left of the matrix) is used as the composition operator.

The described rule gives the following results in the methodical example for the first line of the formula (4):
a) in a case of using the output of the element 4 toward the element 1:

$$x_1(k+1)=x_3(k)ORi\ x_4(k),$$

b) otherwise:

$$x_1(k+1)=x_3(k)ORi0.$$

If, for example, the x(k) vector of the model (4) has the components 0, 1, *, 1, 0, * in a certain k-tact, i.e., the elements 1 and 5 of the diagnosed object function correctly, the elements 2 and 4 have failures or are subject to their influence, and nothing definite may be stated in respect of the elements 3 and 6, and a calculation result in accordance with Table 1 takes the following values:
a) in a case of using the output of the element 4 toward the element 1:
the formula *+1=1 is located in Table 1 at the crossing of the 1st line and the 7th column, consequently, the composition result has the value of 1, i.e., the DO first element will be subject to the failure influence;
b) otherwise:
the formula *+0=* is located in Table 1 at the crossing of the 1st line and the 8th column, consequently, the composition result will be indefinite.

In addition to the direct dependency matrix DM, one more binary matrix is introduced that is an exit matrix EM (Exit Matrix) and that is used in accordance with the rules of the matrix algebra. The use of this matrix enables to select only those elements (or, in the general case—their combinations) from all the elements of a diagnosed object DO 2, which correspond to observed failure manifestations $$Y(k)=EM \cdot X(k). \quad (5)$$

Here and after, Y(k) is the failure manifestation vector with m components, X(k) is the DO 2 element technical condition vector with n components, EM is the binary matrix with m lines and n columns; the dot in the middle of a line denotes a multiplication operation performed according to the general rules of matrix algebra [F. R. Gantmakher. Theory of Matrices.—M.: Nauka Publishers, 1988] with due regard to the formulae from Table 1 (lines 1 and 2, columns from 1 to 6, inclusive).

Figure 4:
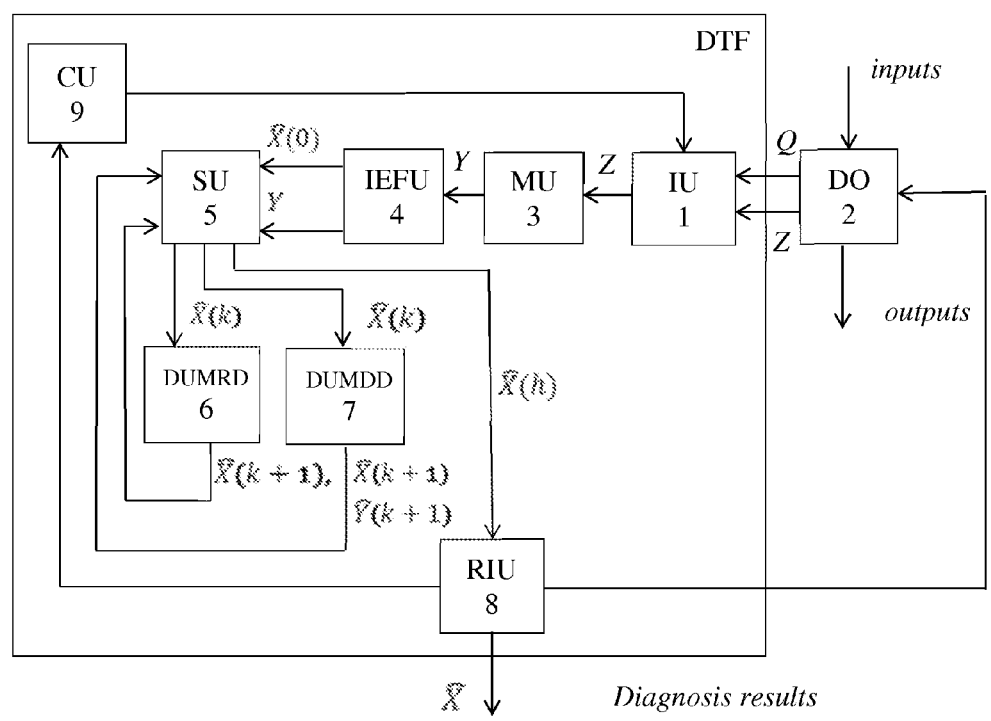
FIG. 4 shows a functional diagram of the device for localizing uncontrollable multiple failures in engineering systems (DTF) according to the present invention.

This matrix is realized by the measuring unit 3 (FIG. 4). Here, $y_l(k)$ is the l-component of the failure manifestation vector Y in the k-tact of a diagnosis cycle; the vector Y has m components in total.

Let the output for the model (4) are the 1$^{st}$ and the 5$^{th}$ elements of the condition vector. Then, the exit matrix for the methodical example under consideration is determined by the following equalities:

$$Y(k) = \begin{bmatrix} y_1(k) \\ y_2(k) \end{bmatrix} \quad (6)$$

$$= EM \cdot \begin{bmatrix} x_1(k) \\ x_2(k) \\ x_3(k) \\ x_4(k) \\ x_5(k) \\ x_6(k) \end{bmatrix}$$

$$= \underbrace{\begin{bmatrix} 1 & 0 & 0 & 0 & 0 & 0 \\ 0 & 0 & 0 & 0 & 1 & 0 \end{bmatrix}}_{EM} \cdot \begin{bmatrix} x_1(k) \\ x_2(k) \\ x_3(k) \\ x_4(k) \\ x_5(k) \\ x_6(k) \end{bmatrix}$$

$$= \begin{bmatrix} y_1(k) \\ y_2(k) \end{bmatrix}.$$

So, Equation (3) describes the generalized development of failure influences from vertex to vertex (from element to element of the DO 2); Equation (5) describes failure manifestations (on some DO 2 elements, which corresponds to the physical nature of the DO 2).

A particular DO model is adequate to the process of failure development in a real system, which is supported by formalized descriptions of systems, experts' opinions and results of semi-natural experiments. After the model reliability is confirmed, failure localizing is carried out.

Failure Localizing

It is a priori supposed in this technical solution that failures may be both simple (single) and complex (multiple). The only limitation, as introduced here, is that failures are not changed during one full cycle of their localizing.

The procedure of reverse transformations of the model introduced as above, see Equations (3) and (5), consists of several steps.

It is supposed that the measuring unit MU 3 correctly determines the Y(0) observed failure manifestation vector at a time 0 corresponding to the beginning of a regular localizing cycle.

Step 1. $\hat{X}(0)$ estimate is formed for the whole X(0) technical condition vector of the system (logical variables of all the vertices of the mixed graph) at a time 0 corresponding to the beginning of a regular localizing cycle. The following values are assigned to the elements of the $\hat{X}(0)$ vector: "0"—the respective element is definitely operable; "1"—the respective element is definitely non-operable; "*"—an uncertain element which operability may not be evaluated proceeding from the observed failure manifestation.

This procedure determines the whole totality of solutions for Equation (5) written for the beginning time of a regular failure localizing cycle, i.e., $$Y(0)=EM \cdot X(0), m<n, \quad (7)$$

in respect of the X(0) vector.

In the general case the solution of Equation (7) is determined by the following formula [V. N. Bukov, Embedding of Systems. An Analytical Approach To Analysis And Synthesis Of Matrix Systems.—Kaluga: Scientific Literature Publishing House of N. F. Bochkareva, 2006]

$$\{\hat{X}(0)\}_\mu = (EM)^- \cdot Y(0) + \overline{EM}^R \cdot \mu, \quad (8)$$

where the curly brackets indicate a plurality of indiscernible solutions, the plurality being caused by varying the vector μ with random elements. In the formula (8): μ is the vector having n−rankEM elements, i.e., the number of the elements is equal to the number of linearly dependent lines of the matrix EM with the use of binary operations [F. R. Gantmakher, Theory of Matrices. M.: Nauka Publishers, 1988];

$\widetilde{EM}$ is the canonizer for the matrix EM, i.e., a matrix which ensures fulfillment of the identity $\widetilde{EM} = \widetilde{EM} \cdot EM \cdot \widetilde{EM}$; $\overline{EM}^R$ is the right divisor of zero for the matrix EM of maximum rank, i.e., a matrix having the dimension n×(n−rankEM) for which the condition $EM \cdot \overline{EM}^R = 0$ is fulfilled.

The canonizer (EM)$^\sim$ in the tasks under consideration (all the elements of the EM matrix are represented by 0s and 1s only, and the matrix itself has a maximum line rank) is equal to the transposed value of the source matrix: $(EM)^\sim = (EM)^T$. Thus, the resulting formula has the following form:

$$\{\hat{X}(0)\}_\mu = (EM)^T \cdot Y(0) + \overline{EM}^R \cdot \mu, \quad (9)$$

and all the elements of the vector μ are hereinafter represented by asterisks * (condition uncertainness). All operations in (9) are fulfilled according to the known rules of matrix algebra with due regard to the formulae from Table 1 (lines 1 and 2, columns from 1 to 6, inclusive).

Step 2. On the basis of the known DM matrix, and, in particular, its inversion rDM (reverse Dependency Matrix), the components of the X vector marked with "*", i.e., regularly uncertain, are specified in the reverse sequence of failure influence propagation according to the following formula:

$$\hat{X}(\tau+1) = rDM \diamond \hat{X}(\tau), \tau=0,1,2 \ldots, \quad (10)$$

The DM matrix inversion is performed by transposing it (interchanging elements of lines and columns, including totalities of logical operators, i.e., a list of line operators goes to a list of column operators, and vice versa) and by changing source operators by their inversions (reverse analysis logic according to Table 2 is used instead direct analysis logic according to Table 1).

The model of the kind (10) is a reverse triplex logical model (RTLM), and the rDM coefficient matrix is a failure propogation logical matrix of reverse dependency. The compact notation (10), as (3), resembles matrix equality, but, as (3), is not it in the sense that no known rules of matrix algebra are applicable to it.

The rules of working with a rDM are similar to the above-described rules, with due regard to two circumstances:

1. Now, solution variants are caused by the rORi and rANDi operators (where there are two 1s in a column) in accordance with Table 2. These are alternative variants (hypotheses) of the failure propagation pre-history that are subject to further analysis. After each passing of such operator it is necessary to treble a number of analyzed variants, since the number of possible values for variables is equal to three (0, 1, *).

2. During calculation of values conflicts that relate to different lines are possible, as shown in Table 2. Then, corresponding hypotheses concerning the failure propagation pre-history are omitted.

In such a case, the first circumstance defines the rule of branching of a "failure tree", and the second one excludes unpromising (contradicting to the diagnosed object 2 logic) branches.

In general, the iteration procedure of localizing failures with fulfillment of back steps may be written as the following formula:

$$\hat{X}(\tau)=rDM \diamond (rDM \diamond ( \ldots (rDM \diamond (EM^T \cdot Y(0) + \overline{EM^R} \cdot \mu)))). \quad (11)$$

A number of cycle tacts $\tau$ is selected from the provision of either terminating deformation (change) of the condition vector $X(\tau+1)=X(\tau)$, or limiting to some value.

The direct use of the failure propagation logical model of reverse dependency in respect of elements with *-value ("condition not determined") may lead to multiplication of uncertainty. Therefore, when failure localizing in a case of an uncertainty multiplication situation, a logical model of direct dependency is changed. According to the invention, the technical condition estimate vector for diagnosed object elements is specified, cyclically in tacts and cyclically for components, with the use of columns of the logical matrix of reverse dependency, which correspond to elements with the values of "operable" and "non-operable", and with the use of lines of the logical model of direct dependency, which correspond to the value of "condition not determined". Various embodiments of the proposed generalized method are possible. Here, one embodiment is described.

The exit logic of ORo elements is considered as follows. If, according to the adopted system of forming exit logic, an ORo element transmits 0 in some outputs instead of 1 (failure condition), then corresponding 1s in the DM and rDM matrices are called inverse. For reflecting this fact explicitly, the notation $\overline{1}$ is used, and logical matrices of direct and reverse dependency that comprise inverse is i.e. $\overline{1}$ are denoted as $\overline{DM}$ and $\overline{rDM}$, respectively.

The value of each j-component $x_j(\tau+1)$ of the diagnosed object condition model (10) in the $\tau+1$ tact with a possible value from the triad "0, 1, *" is determined by a composition of coefficients of the j-line of the rDM and the $x_j(\tau)$ vector component in the $\tau$ tact in the right side of the equality, according to the following rules.

First, the failure propagation logical matrix of reverse dependency $r\overline{DM}$ is used. It is applied only in respect of elements of the $\hat{X}(\tau)$ vector having the values of "operable" (0) and "non-operable" (1). The $\hat{X}(\tau)$ vector is specified cyclically, from tact to tact and from component to component. This is to be performed according to the following rules:

A. An external cycle is organized, during which the components of the $\hat{X}(\tau)$ vector are specified from tact to tact $\tau$, $\tau=0, 1, 2, 3 \ldots$.

B. An inner cycle of alternate specification of the components of the $\hat{X}(\tau)$ vector from the first component to the last one: $j=1 \ldots n$ is organized. For this, only components having values of 0 and 1 of the $\hat{X}(\tau)$ vector in the right side of the formula (10) are selected. The components with the value of * are omitted, because the use of a failure propagation logical matrix of reverse dependency in respect of them leads only to uncertainty multiplication.

For each new value of ti and j the following analysis is carried out:

1. If $\hat{x}_j(\tau)=0$, and the $r\overline{DM}$ matrix column corresponding thereto is marked with the rORi operator, then zero values are assigned to each component of the vector $\hat{x}_j(\tau+1)$, which corresponds to 1-elements in the j-column of the rDM matrix. The values of the components $\hat{x}_j(\tau+1)$ corresponding to inverse $\overline{1}$ of the $r\overline{DM}$ matrix are not changed.

2. If $\hat{x}_j(\tau)=0$ and the $r\overline{DM}$ matrix column corresponding thereto is marked with the rANDi operator, then 1-elements are searched for in the j-column of the $r\overline{DM}$ matrix, and values of corresponding components of the $\hat{X}(\tau)$ vector are checked. If of all these values some are equal to 1 and one value is not determined (*), then 0 is assigned to the indefinite value of that component of the $\hat{X}(\tau+1)$ vector. If the j-column of the $r\overline{DM}$ matrix contains inverse is i.e. $\overline{1}$ to which 1-values of the condition vector components correspond, then these components are not changed.

3. If $\hat{x}_j(\tau)=1$ and the corresponding column of the $r\overline{DM}$ matrix is marked with the rORi operator, then 1-elements are searched for in the j-column of the $r\overline{DM}$ matrix, and 1-elements are searched for, and values of corresponding components of the $\hat{X}(\tau+1)$ vector are checked. If, among these components, all values corresponding to is of the matrix are equal to 0, all values corresponding to inverse 1s i.e. $\overline{1}$ of the matrix are equal to 1, and one value is not determined (*), then 1 is assigned to the not determined component of the $\hat{X}(\tau+1)$ vector (if only it does not correspond to inverse 1 i.e. $\overline{1}$). If inverse 1 i.e. $\overline{1}$ corresponds to the only not-determined value, then a conflict situation exists.

4. If $\hat{x}_j(\tau)=1$ and the corresponding column of the $r\overline{DM}$ matrix is marked with the rANDi operator, then the 1-value is assigned to each component of the $\hat{X}(\tau+1)$ vector, which corresponds to 1-element in the j-column of the $r\overline{DM}$ matrix. The inverse is i.e. $\overline{1}$ in that column of the $r\overline{DM}$ matrix should be absent. If they are present, a conflict situation exists.

After performing a pre-set number of tacts, a situation may exist that not all components of the $\hat{X}(\tau)$ vector obtained the value of 0 or 1, and components with the * value remain. The failure propagation logical model of direct dependency (3), in particular a composition of the j-line only, is applied in respect of these components, in particular the following composition:

$$\hat{x}_j(\tau+1)=\overline{DM}_j \diamond \hat{X}(\tau).$$

In this case the following logic is realized:
  if the corresponding j-line of the $\overline{DM}$ matrix is marked with the ORi operator, and even if only one 1 is among the $\hat{X}(\tau)$ components corresponding the 1 values of this line of the $\overline{DM}$ matrix (but not to inverse is i.e. $\overline{1}$), then $\hat{x}_j(\tau+1)=1$;
  if the corresponding j-line of the $\overline{DM}$ matrix is marked with the ANDi operator, and if even one 0 or even one 1 corresponding to inverse 1 i.e. $\overline{1}$s is among the $\hat{X}(\tau)$ components corresponding to the 1 values of this line of the $\overline{DM}$ matrix, then $\hat{x}_j(\tau+1)=0$;
  otherwise, the value remains unchanged, $\hat{x}_j(\tau+1)=*$.

Step 3. Possible points of proved failures are indicated by obtained one's values of components of the $\hat{X}$ estimate of the technical condition vector. The presence of zero elements shows reliably operable elements of the DO 2. The presence of asterisks * indicates those elements of the DO 2 (modules, units, devices, sub-systems), in respect of which no explicit statement on a failure or fault may be formulated on the basis of information available. This shows incomplete control inherent to the DO 2 (an objective property of the DO 2).

Description of a Methodical Example

This example demonstrates step by step (tact by tact and component by component) how the above-described actions should be carried out and their results relative to the DO shown in FIG. 5. The ORo output logic of each element works as follows. If a failure is present (value is equal to 1), it is transmitted as 1 to an element with a lesser sequence number, and 0 is transmitted to an element with a greater sequence number. The elements 1 and 5 are the system output. In this case the EM matrix has the form (5). Direct failures contain the elements 1 and 3.

The failure propagation process for a DO is described by the model (3).

The first tact:

$$\begin{bmatrix} x_1(1) \\ x_2(1) \\ x_3(1) \\ x_4(1) \\ x_5(1) \\ x_6(1) \end{bmatrix} =$$

$$\begin{matrix} ORi \\ ORi \\ ANDi \\ ANDi \\ ORi \\ ANDi \end{matrix} \underbrace{\begin{bmatrix} 0 & 0 & 1 & 1 & 0 & 0 \\ 1 & 0 & 0 & 0 & 0 & 0 \\ 0 & 1 & 0 & 0 & 0 & 0 \\ 0 & 0 & 1 & 0 & 0 & 1 \\ 0 & 0 & 0 & 1 & 0 & 1 \\ 1 & 1 & 0 & 0 & 0 & 0 \end{bmatrix}}_{DM} \begin{matrix} \\ ORo \ ANDo \ ANDo \ ORo \ ORo \ ORo \end{matrix} \diamond \begin{bmatrix} 1 \\ 0 \\ 1 \\ 1 \\ 0 \\ 0 \\ 0 \end{bmatrix} + \begin{bmatrix} 1 \\ 0 \\ 0 \\ 1 \\ 0 \\ 0 \\ 0 \end{bmatrix} = \begin{bmatrix} 1 \\ 1 \\ 1 \\ 1 \\ 0 \\ 0 \end{bmatrix}.$$

The second tact:

$$\begin{bmatrix} x_1(2) \\ x_2(2) \\ x_3(2) \\ x_4(2) \\ x_5(2) \\ x_6(2) \end{bmatrix} =$$

$$\begin{matrix} ORi \\ ORi \\ ANDi \\ ANDi \\ ORi \\ ANDi \end{matrix} \underbrace{\begin{bmatrix} 0 & 0 & 1 & 1 & 0 & 0 \\ 1 & 0 & 0 & 0 & 0 & 0 \\ 0 & 1 & 0 & 0 & 0 & 0 \\ 0 & 0 & 1 & 0 & 0 & 1 \\ 0 & 0 & 0 & 1 & 0 & 1 \\ 1 & 1 & 0 & 0 & 0 & 0 \end{bmatrix}}_{DM} \begin{matrix} \\ ORo \ ANDo \ ANDo \ ORo \ ORo \ ORo \end{matrix} \diamond \begin{bmatrix} 1 \\ 1 \\ 1 \\ 1 \\ 0 \\ 0 \\ 0 \end{bmatrix} + \begin{bmatrix} 1 \\ 0 \\ 0 \\ 1 \\ 0 \\ 0 \\ 0 \end{bmatrix} = \begin{bmatrix} 1 \\ 1 \\ 1 \\ 1 \\ 0 \\ 0 \end{bmatrix}.$$

In tacts that follow no element condition change takes place. Thus, if the $1^{st}$ and the 3rd elements fail, the failure will be propagating to the $2^{nd}$ element.

The failure localizing process can be implemented as follows.

Step 1. The formula (9) takes the form:

$$\{\hat{X}(0)\}_\mu = \underbrace{\begin{bmatrix} 1 & 0 \\ 0 & 0 \\ 0 & 0 \\ 0 & 0 \\ 0 & 1 \\ 0 & 0 \end{bmatrix}}_{(EM)^T} \cdot \underbrace{\begin{bmatrix} 1 \\ 0 \end{bmatrix}}_{Y(0)} + \underbrace{\begin{bmatrix} 0 & 0 & 0 & 0 \\ 1 & 0 & 0 & 0 \\ 0 & 1 & 0 & 0 \\ 0 & 0 & 1 & 0 \\ 0 & 0 & 0 & 0 \\ 0 & 0 & 0 & 1 \end{bmatrix}}_{EM^R} \cdot \begin{bmatrix} * \\ * \\ * \\ * \\ * \end{bmatrix}_\mu = \begin{bmatrix} 1 \\ * \\ * \\ * \\ 0 \\ * \end{bmatrix}.$$

Thus, after the first step the condition of the $2^{nd}$, $3^{rd}$, $4^{th}$ and $6^{th}$ elements remains non-determined Step 2. In accordance with Equation (3), the recurrent relation for the reverse succession of failure propagation has the form:

$$\begin{bmatrix} x_1(\tau+1) \\ x_2(\tau+1) \\ x_3(\tau+1) \\ x_4(\tau+1) \\ x_5(\tau+1) \\ x_6(\tau+1) \end{bmatrix} = \quad (12)$$

$$\begin{matrix} rORo \\ rANDo \\ rANDo \\ rORo \\ rORo \\ rORo \end{matrix} \underbrace{\begin{bmatrix} 0 & 1 & 0 & 0 & 0 & 1 \\ 0 & 0 & 1 & 0 & 0 & 1 \\ 1 & 0 & 0 & 1 & 0 & 0 \\ 1 & 0 & 0 & 0 & 1 & 0 \\ 0 & 0 & 0 & 0 & 0 & 0 \\ 0 & 0 & 0 & 1 & 1 & 0 \end{bmatrix}}_{rDM} \begin{matrix} \\ rORi \ rORi \ rANDi \ rANDi \ rORi \ rANDi \end{matrix} \diamond \begin{bmatrix} x_1(\tau) \\ x_2(\tau) \\ x_3(\tau) \\ x_4(\tau) \\ x_5(\tau) \\ x_6(\tau) \end{bmatrix},$$

where $\tau=0, 1, 2, \ldots$ —a number of backward analysis tact. In view the adopted ORo output logic, the rDM matrix takes the form:

$$r\overline{DM} = \begin{bmatrix} 0 & 1 & 0 & 0 & 0 & \overline{1} \\ 0 & 0 & 1 & 0 & 0 & 1 \\ 1 & 0 & 0 & 1 & 0 & 0 \\ 1 & 0 & 0 & 0 & \overline{1} & 0 \\ 0 & 0 & 0 & 0 & 0 & 0 \\ 0 & 0 & 0 & 1 & \overline{1} & 0 \end{bmatrix},$$

$$rORi \ rORi \ rANDi \ rANDi \ rORi \ rANDi$$

where $\overline{1}$ are inverse 1s taking into account the output logic in the rDM.

Note: in order to reduce the record volume, here both the $X(\tau+1)$ vector and the $X(\tau)$ vector are specified at the same time. In order to reduce the record volume, the direct logical model will be applied for elements with the values of 0 and 1, and the reverse logical model will be applied for non-determined elements *.

An external cycle, the $1^{st}$ iteration, $\tau=0$, the use of the model (12) gives:

$$\begin{bmatrix} x_1(1) \\ x_2(1) \\ x_3(1) \\ x_4(1) \\ x_5(1) \\ x_6(1) \end{bmatrix} = \underbrace{\begin{bmatrix} 0 & 1 & 0 & 0 & 0 & \bar{1} \\ 0 & 0 & 1 & 0 & 0 & 1 \\ 1 & 0 & 0 & 1 & 0 & 0 \\ 1 & 0 & 0 & 0 & \bar{1} & 0 \\ 0 & 0 & 0 & 0 & 0 & 0 \\ 0 & 0 & 0 & 1 & \bar{1} & 0 \end{bmatrix}}_{\underset{rDM}{rORi\ rORi\ rANDi\ rANDi\ rORi\ rANDi}} \diamond \begin{bmatrix} 1 \\ * \\ * \\ * \\ 0 \\ * \end{bmatrix}.$$

An inner cycle, $j=1$, $\hat{x}_1(0)=1$, the first column of the $\overline{rDM}$ matrix corresponds to the rORi logic. There are two 1-elements in the first column of the $\overline{rDM}$ matrix, $\hat{x}_3(0)=*$ and $\hat{x}_4(0)=*$ correspond to them. Therefore, the condition vector cannot be specified.

An inner cycle, $j=2$, $\hat{x}_2(0)=*$. In order to specify the component, the $2^{nd}$ line of the logical matrix of direct dependency (3) is used:

$$x_2(1) = ORi[1\ 0\ 0\ 0\ 0\ 0] \diamond \begin{bmatrix} 1 \\ * \\ * \\ * \\ 0 \\ * \end{bmatrix} = 1.$$

An inner cycle, $j=3$, $\hat{x}_3(0)=*$. In order to specify the component, the $3^{rd}$ line of the logical matrix of direct dependency (3) is used:

$$x_3(1) = ANDi[0\ 1\ 0\ 0\ 0\ 0] \diamond \begin{bmatrix} 1 \\ 1 \\ * \\ * \\ 0 \\ * \end{bmatrix} = 1.$$

An inner cycle, $j=4$, $\hat{x}(0)=*$. In order to specify the component, the $4^{th}$ line of the logical matrix of direct dependency (3) is used:

$$x_4(1) = ANDi[0\ 0\ 1\ 0\ 0\ 1] \diamond \begin{bmatrix} 1 \\ 1 \\ 1 \\ * \\ 0 \\ * \end{bmatrix} = *.$$

The condition vector cannot be specified.

An inner cycle, $j=5$, $\hat{x}(0)=0$, the fifth column of the $\overline{rDM}$ matrix is marked with the rORi operator. The fifth column of the $\overline{rDM}$ matrix contain inverse $\bar{1}$s only. Therefore, the condition vector cannot be specified.

An inner cycle, $j=6$, $\bar{x}_6(0)=*$. In order to specify the component, the $6^{th}$ line of the logical matrix of direct dependency (3) is used:

$$x_6(1) = ANDi[\bar{1}\ 1\ 0\ 0\ 0\ 0] \diamond \begin{bmatrix} 1 \\ 1 \\ 1 \\ * \\ 0 \\ * \end{bmatrix} = 0$$

In the result, the first tact gives for $\tau$:

$$X(1) = \begin{bmatrix} 1 \\ 1 \\ 1 \\ * \\ 0 \\ 0 \end{bmatrix}.$$

An external cycle, the $2^{nd}$ tact, $t=1$:

$$\begin{bmatrix} x_1(2) \\ x_2(2) \\ x_3(2) \\ x_4(2) \\ x_5(2) \\ x_6(2) \end{bmatrix} = \underbrace{\begin{bmatrix} 0 & 1 & 0 & 0 & 0 & \bar{1} \\ 0 & 0 & 1 & 0 & 0 & 1 \\ 1 & 0 & 0 & 1 & 0 & 0 \\ 1 & 0 & 0 & 0 & \bar{1} & 0 \\ 0 & 0 & 0 & 0 & 0 & 0 \\ 0 & 0 & 0 & 1 & \bar{1} & 0 \end{bmatrix}}_{\underset{rDM}{rORi\ rORi\ rANDi\ rANDi\ rORi\ rANDi}} \diamond \begin{bmatrix} 1 \\ 1 \\ 1 \\ * \\ 0 \\ 0 \end{bmatrix}.$$

The first three tacts of an inner cycle do not lead to a change in the X(2). They are omitted here.

An inner cycle, $j=4$, $\hat{x}_4(1)=*$. In order to specify the component, the $4^{th}$ line of the logical matrix of direct dependency (3) is used:

$$x_4(1) = ANDi[0\ 0\ 1\ 0\ 0\ 1] \diamond \begin{bmatrix} 1 \\ 1 \\ 1 \\ * \\ 0 \\ 0 \end{bmatrix} = 0.$$

In further iterations for $\tau$ and for j the X vector is not changed. Therefore, the final estimate has the following value:

$$\hat{X} = \begin{bmatrix} 1 \\ 1 \\ 1 \\ 0 \\ 0 \\ 0 \end{bmatrix}.$$

Step 3. The obtained result justifies the following statement as the failure localizing result: the DO $1^{st}$, $2^{nd}$, and $3^{rd}$ elements failed, and the $4^{th}$, $5^{th}$, and $6^{th}$ elements are operable, there are no elements with the condition not determined.

The DTF is linked to the diagnosed object 2 through the interface unit IU 1. The measuring unit MU 3 controls, according to a set method of control, the technical condition of certain elements of the diagnosed object Y at a time conditionally called the initial time here and forms the failure observed manifestation vector Y(0) for that time. On the basis of information on Y(0) the initial estimate forming unit IEFU 4 forms an initial estimate of the condition vector $\hat{X}(0)$, this estimate being triplex. Specific positions of indeterminacy are determined by the structure of divisors of the exit matrix EM zero, i.e., by a priori information on the structural peculiarities of the DO 2.

The device works in cycles. After receiving information X(0) from the IEFU 4, the cycle of specifying non-determined components of the technical condition vector $\hat{X}$ estimate starts. New information from the initial estimate forming unit IEFU 4 is not received, until calculations in this cycle are completed.

After that, in order to specify the technical condition vector X value, one of the triplex logical models RTLM or DTLM in the form of solution taking units based on logical matrices of reverse and direct dependency is used. Control of model connection and control of a number of cycles is carried out according to instructions issued by the SU 5. Diagnosis results are presented through the second output of the RIU 8.

The decision-taking unit based on the logical model of direct dependency DUMDD 7 is used only in a case where a next specified element is equal to "*", i.e., remains non-determined. In such a case the use of the DUMRD 6 is not productive—see Table 2: back transition from an output having the "*" value always leads to indeterminacy of inputs, i.e., to multiplication of indeterminacy in the system, the DUMDD 7 being used not in full, but only in its part that corresponds to a specified component, i.e., one line of the corresponding logical model. In all other cases only the DUMRD 6 is used. This enables to reduce volume of calculations significantly.

The stop provision is fulfilled, if $\hat{X}(k)=\hat{X}(k-1)$ or 2n and more steps are performed. Thus, a number of iterations does not exceed 2n, where n is the number of diagnosed elements of the DO 2.

The technical effect, i.e., efficiency, in the claimed solution is ensured due to that, taking into account all complexity of the physical processes that really run in the DO 2, the method and the device for localizing failures work exclusively with logical variables, and the simplicity of the algebraic rules used enables to process information in significantly accelerated time. In the result, it is possible to achieve obtaining of diagnosis results nearly in real time.

The depth is ensured by the use (formal reflection) of practically all (all significant or all known) inner links of the DO 2 in the triplex logical models used, which enables to take into account, and with acceptable care, really existing mutual influences of its parts which, depending on the context, are understood as elements, modules, units, devices or sub-systems.

Reliability is ensured by a triplex description of the technical condition of the diagnosed object parts being under control. This enables, in a determined statement (i.e., without regard to action of random factors), to strictly divide all the object's parts into two groups with definite determination of their operability and one group combining the diagnosed object parts for which it is objectively impossible to definitely determine their technical condition.

The possibility of detecting multiple failures is ensured by alternating the reverse triplex logical model and the direct triplex logical model that enable to fulfill the diagnosis objective without support of the simplifying assumption on uniqueness of a failure.

In addition, explicit indication, as obtained in the result of the use of the proposed invention, to the presence and arrangement of the diagnosed object parts for which a definite judgment on their technical condition may not be formulated, gives a unique possibility for further improving the diagnosed object in terms of achieving its deeper control both by introducing additional control points for its parts, and growing a number of inner links (i.e., interconnecting) between those parts.

INDUSTRIAL APPLICABILITY

The claimed method for localizing uncontrollable multiple failures in engineering systems and the device for implementing it may be most successfully applied in the industry in systems for functional diagnosis of complex engineering objects for the purpose of localizing failures in real time against the background of natural signals, as well as in processes of designing complex engineering systems in the whole and their sub-systems of functional diagnosis in particular.

What is claimed is:

1. A cyclical method for localizing uncontrollable multiple failures in engineering systems in operation, comprising: using a signal interface unit provided as an apparatus to receive signals from a diagnosed object and selectively transmitting corresponding signals to a measuring unit, said signals processed to start a cycle of a diagnosis process; determining a failure manifestations vector with Boolean elements on the basis of the received signals; a-using an initial technical condition estimate forming unit provided as an apparatus to form an initial technical condition estimate vector from the failure manifestations vector with the use of an exit matrix canonizer for the diagnosed object elements, said estimate vector giving triplex values "operable", "non-operable", "condition not determined", the value "condition not determined" specified on the basis of a failure propagation direct dependency; providing an output of the initial technical condition to a switching unit provided as an apparatus and controlled by a result interpretation unit; using the switching unit and the result interpretation unit to provide outputs of the initial estimate forming unit to a decision-taking unit based on a triplex logical model of reverse dependency and to a decision-taking unit based on a triplex logical model of direct dependency using the switching unit to receive outputs from the decision-taking unit based on a triplex logical model of reverse dependency and from decision-taking unit based on a triplex logical model of direct dependency, with the switching unit, the result interpretation unit and the decision taking unit using a triplex logical model of reverse dependency to apply a reverse dependency matrix, with the technical condition estimate vector for the diagnosed object elements specified cyclically, to generate further technical condition estimates giving triplex values until estimates either do not change, or until completion of a preset number of cycles; in the case of obtaining the value "condition not determined" for elements of the technical condition estimate vector, are specified on the basis of a triplex logical model of failure propagation direct dependency, using the result interpretation unit to issue a final value of the technical condition estimate vector for the diagnosed object elements.

* * * * *